(12) United States Patent
Maes (10) Patent No.: US 9,503,407 B2
(45) Date of Patent: Nov. 22, 2016

(54) MESSAGE FORWARDING

(75) Inventor: Stephane H. Maes, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 836 days.

(21) Appl. No.: 12/957,697

(22) Filed: Dec. 1, 2010

(65) Prior Publication Data

US 2011/0142211 A1 Jun. 16, 2011

Related U.S. Application Data

(60) Provisional application No. 61/286,981, filed on Dec. 16, 2009.

(51) Int. Cl.
*H04M 3/42* (2006.01)
*H04L 12/58* (2006.01)
*H04M 3/493* (2006.01)

(52) U.S. Cl.
CPC .......... *H04L 51/14* (2013.01); *H04M 3/42382* (2013.01); *H04M 3/493* (2013.01)

(58) Field of Classification Search
CPC ........................... H04L 65/01; H04L 12/1407
USPC ................. 379/88.01–88.23, 221.01, 211.01, 379/88.25, 201.02; 455/401, 414.4; 709/206, 227
See application file for complete search history.

(56) References Cited

U.S. PATENT DOCUMENTS

| | | |
|---|---|---|
| 5,414,812 A | 5/1995 | Filip et al. |
| 5,613,060 A | 3/1997 | Britton et al. |
| 5,699,513 A | 12/1997 | Feigen et al. |
| 5,737,321 A | 4/1998 | Takahashi |
| 5,786,770 A | 7/1998 | Thompson |

(Continued)

FOREIGN PATENT DOCUMENTS

| | | |
|---|---|---|
| EP | 2 034 748 A1 | 3/2009 |
| WO | WO 2007134468 A1 | 11/2007 |

(Continued)

OTHER PUBLICATIONS

U.S. Appl. No. 11/848,347, filed Aug. 31, 2007, Notice of Allowance mailed Mar. 2, 2012, 9 pages.

(Continued)

*Primary Examiner* — Olisa Anwah
(74) *Attorney, Agent, or Firm* — Kilpatrick Townsend & Stockton LLP (57) ABSTRACT

Embodiments of the invention provide systems and methods for handling a communication, for example to provide a forwarding service. According to one embodiment, handling a communication can comprise receiving and storing one or more forwarding instructions, intercepting a message from a first user to a second user at a first address, applying one or more stored forwarding instructions to the message to determine at least one second address, and forwarding the message to the second user at the second address. In some cases, the at least one second address can comprise a plurality of addresses. Additionally or alternatively, the first address can be on a first communication channel and the second address can be on a second communication channel. The message can comprise a voice call, an email, a Short Message Service (SMS) message, a Multimedia Messaging Service (MMS) message, an Instant Message (IM), or another type of message.

19 Claims, 4 Drawing Sheets

(56) References Cited

U.S. PATENT DOCUMENTS

| | | | |
|---|---|---|---|
| 5,850,517 A | 12/1998 | Verkler et al. | |
| 5,867,665 A | 2/1999 | Butman et al. | |
| 5,946,634 A | 8/1999 | Korpela | |
| 6,115,690 A | 9/2000 | Wong | |
| 6,119,104 A | 9/2000 | Brumbelow | |
| 6,128,645 A | 10/2000 | Butman et al. | |
| 6,157,941 A | 12/2000 | Verkler et al. | |
| 6,163,800 A | 12/2000 | Ejiri | |
| 6,192,231 B1* | 2/2001 | Chapman et al. | 455/401 |
| 6,192,414 B1 | 2/2001 | Horn | |
| 6,230,271 B1 | 5/2001 | Wadlow et al. | |
| 6,272,556 B1 | 8/2001 | Gish | |
| 6,275,857 B1 | 8/2001 | McCartney | |
| 6,336,138 B1 | 1/2002 | Caswell et al. | |
| 6,374,305 B1 | 4/2002 | Gupta et al. | |
| 6,463,462 B1* | 10/2002 | Smith | G06Q 10/107 709/206 |
| 6,466,984 B1 | 10/2002 | Naveh et al. | |
| 6,496,864 B1 | 12/2002 | McCartney | |
| 6,553,108 B1 | 4/2003 | Felger | |
| 6,578,159 B1 | 6/2003 | Kitagawa et al. | |
| 6,611,812 B2 | 8/2003 | Hurtado et al. | |
| 6,611,867 B1 | 8/2003 | Bowman-Amuah | |
| 6,633,560 B1 | 10/2003 | Albert et al. | |
| 6,748,570 B1 | 6/2004 | Bahrs et al. | |
| 6,792,605 B1 | 9/2004 | Roberts et al. | |
| 6,813,278 B1 | 11/2004 | Swartz et al. | |
| 6,823,338 B1 | 11/2004 | Byrne et al. | |
| 6,868,413 B1 | 3/2005 | Grindrod et al. | |
| 6,965,902 B1 | 11/2005 | Ghatate | |
| 6,978,348 B2 | 12/2005 | Belknap et al. | |
| 6,981,023 B1* | 12/2005 | Hamilton et al. | 709/206 |
| 6,985,939 B2 | 1/2006 | Fletcher et al. | |
| 6,990,491 B2 | 1/2006 | Dutta et al. | |
| 7,003,578 B2 | 2/2006 | Kanada et al. | |
| 7,042,988 B2 | 5/2006 | Juitt et al. | |
| 7,043,538 B2 | 5/2006 | Guedalia et al. | |
| 7,051,092 B2 | 5/2006 | Lenz et al. | |
| 7,072,653 B1 | 7/2006 | Sladek et al. | |
| 7,073,055 B1 | 7/2006 | Freed et al. | |
| 7,089,317 B2 | 8/2006 | Jeyaraman et al. | |
| 7,092,385 B2 | 8/2006 | Gallant et al. | |
| 7,106,848 B1 | 9/2006 | Barlow et al. | |
| 7,111,060 B2 | 9/2006 | Araujo et al. | |
| 7,114,146 B2 | 9/2006 | Zhang et al. | |
| 7,114,148 B2 | 9/2006 | Irving et al. | |
| 7,133,669 B2 | 11/2006 | Nair et al. | |
| 7,143,094 B2 | 11/2006 | Arroyo et al. | |
| 7,146,616 B2 | 12/2006 | Dorner et al. | |
| 7,185,333 B1 | 2/2007 | Shafron | |
| 7,185,342 B1 | 2/2007 | Carrer et al. | |
| 7,194,482 B2 | 3/2007 | Larkin et al. | |
| 7,222,148 B2 | 5/2007 | Potter et al. | |
| 7,222,334 B2 | 5/2007 | Casati et al. | |
| 7,266,600 B2 | 9/2007 | Fletcher et al. | |
| 7,269,162 B1 | 9/2007 | Turner | |
| 7,269,431 B1* | 9/2007 | Gilbert | 455/466 |
| 7,272,625 B1 | 9/2007 | Hannel et al. | |
| 7,281,029 B2 | 10/2007 | Rawat | |
| 7,295,532 B2 | 11/2007 | Haller et al. | |
| 7,302,570 B2 | 11/2007 | Beard et al. | |
| 7,340,508 B1 | 3/2008 | Kasi et al. | |
| 7,409,707 B2 | 8/2008 | Swander et al. | |
| 7,411,943 B2 | 8/2008 | Kittredge et al. | |
| 7,415,010 B1 | 8/2008 | Croak et al. | |
| 7,426,381 B2 | 9/2008 | Maes | |
| 7,433,838 B2 | 10/2008 | Welsh et al. | |
| 7,443,972 B1 | 10/2008 | Barlow et al. | |
| 7,444,620 B2 | 10/2008 | Marvin | |
| 7,447,793 B2 | 11/2008 | Morioka | |
| 7,448,022 B1 | 11/2008 | Ram et al. | |
| 7,454,399 B2 | 11/2008 | Matichuk | |
| 7,461,062 B2 | 12/2008 | Stewart et al. | |
| 7,467,384 B2 | 12/2008 | Brubacher et al. | |
| 7,472,349 B1 | 12/2008 | Srivastava et al. | |
| 7,478,416 B2 | 1/2009 | Edson | |
| 7,519,076 B2 | 4/2009 | Janssen et al. | |
| 7,580,994 B1 | 8/2009 | Fiszman et al. | |
| 7,590,696 B1* | 9/2009 | Odell et al. | 709/206 |
| 7,617,521 B2 | 11/2009 | Maes | |
| 7,630,953 B2 | 12/2009 | Stauber et al. | |
| 7,644,145 B2 | 1/2010 | Rockwell | |
| 7,660,297 B2 | 2/2010 | Fisher et al. | |
| 7,676,813 B2 | 3/2010 | Bisset et al. | |
| 7,702,792 B2* | 4/2010 | Shaffer et al. | 709/227 |
| 7,716,310 B2 | 5/2010 | Foti | |
| 7,720,926 B2 | 5/2010 | Asahara | |
| 7,730,129 B2 | 6/2010 | Wang et al. | |
| 7,752,634 B1 | 7/2010 | Saxena et al. | |
| 7,779,445 B2 | 8/2010 | Ellis | |
| 7,853,647 B2 | 12/2010 | Maes | |
| 7,860,490 B2 | 12/2010 | Maes | |
| 7,865,607 B2 | 1/2011 | Sonalkar et al. | |
| 7,873,716 B2 | 1/2011 | Maes | |
| 7,904,909 B1 | 3/2011 | Reiner et al. | |
| 7,925,727 B2 | 4/2011 | Sullivan et al. | |
| 7,933,397 B2 | 4/2011 | Jain | |
| 8,023,971 B2 | 9/2011 | Egli | |
| 8,027,921 B1 | 9/2011 | Boydstun et al. | |
| 8,032,920 B2 | 10/2011 | Maes | |
| 8,036,362 B1 | 10/2011 | Skinner | |
| 8,060,067 B2* | 11/2011 | Tarleton et al. | 455/414.4 |
| 8,068,860 B1 | 11/2011 | Midkiff | |
| 8,073,810 B2 | 12/2011 | Maes | |
| 8,086,665 B1 | 12/2011 | Soukup et al. | |
| 8,090,848 B2 | 1/2012 | Maes | |
| 8,114,555 B2 | 2/2012 | Leonida et al. | |
| 8,121,278 B2 | 2/2012 | Leigh et al. | |
| 8,161,171 B2 | 4/2012 | Maes | |
| 8,214,503 B2 | 7/2012 | Maes | |
| 8,223,951 B1* | 7/2012 | Edelhaus et al. | 379/221.01 |
| 8,230,449 B2 | 7/2012 | Maes | |
| 8,255,470 B2 | 8/2012 | Jackson et al. | |
| 8,321,498 B2 | 11/2012 | Maes | |
| 8,321,594 B2 | 11/2012 | Maes et al. | |
| 8,335,862 B2 | 12/2012 | Fletcher et al. | |
| 8,370,506 B2 | 2/2013 | Maes | |
| 8,401,009 B1* | 3/2013 | Dorsey | H04L 51/066 370/389 |
| 8,401,022 B2 | 3/2013 | Maes et al. | |
| 8,458,703 B2 | 6/2013 | Maes | |
| 8,478,311 B2* | 7/2013 | Sennett et al. | 455/466 |
| 8,505,067 B2 | 8/2013 | Maes | |
| 8,533,773 B2 | 9/2013 | Maes | |
| 8,539,097 B2 | 9/2013 | Maes | |
| 8,543,665 B2 | 9/2013 | Ansari et al. | |
| 8,589,338 B2 | 11/2013 | Maes | |
| 8,675,852 B2 | 3/2014 | Maes | |
| 8,676,155 B2* | 3/2014 | Fan et al. | 455/406 |
| 8,744,055 B2 | 6/2014 | Maes | |
| 8,849,685 B2 | 9/2014 | Oden | |
| 8,879,547 B2 | 11/2014 | Maes | |
| 8,914,493 B2 | 12/2014 | Maes et al. | |
| 8,918,493 B1 | 12/2014 | Beach et al. | |
| 8,966,498 B2 | 2/2015 | Maes | |
| 9,038,082 B2 | 5/2015 | Maes | |
| 9,083,599 B2 | 7/2015 | Huuhtanen et al. | |
| 9,088,570 B2 | 7/2015 | Anderson et al. | |
| 2001/0010053 A1 | 7/2001 | Ben-Shachar et al. | |
| 2001/0016880 A1 | 8/2001 | Cai et al. | |
| 2001/0028649 A1 | 10/2001 | Pogossiants et al. | |
| 2002/0002684 A1 | 1/2002 | Fox et al. | |
| 2002/0004827 A1 | 1/2002 | Ciscon et al. | |
| 2002/0075844 A1 | 6/2002 | Hagen | |
| 2002/0087674 A1 | 7/2002 | Guilford et al. | |
| 2002/0099738 A1 | 7/2002 | Grant | |
| 2002/0101879 A1 | 8/2002 | Bouret | |
| 2002/0104015 A1 | 8/2002 | Barzilai et al. | |
| 2002/0111848 A1 | 8/2002 | White | |
| 2002/0120697 A1* | 8/2002 | Generous | H04L 29/06 709/206 |
| 2002/0120729 A1 | 8/2002 | Faccin et al. | |
| 2002/0143819 A1 | 10/2002 | Han et al. | |
| 2002/0144119 A1 | 10/2002 | Benatar | |

(56) References Cited

U.S. PATENT DOCUMENTS

| | | |
|---|---|---|
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0005034 A1 | 1/2003 | Amin |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0118167 A1 | 6/2003 | Sammon et al. |
| 2003/0120502 A1 | 6/2003 | Robb et al. |
| 2003/0131076 A1 | 7/2003 | Nelson et al. |
| 2003/0135553 A1 | 7/2003 | Pendakur |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0182550 A1 | 9/2003 | Chen et al. |
| 2003/0185233 A1 | 10/2003 | Ji et al. |
| 2003/0191769 A1 | 10/2003 | Crisan et al. |
| 2003/0191823 A1 | 10/2003 | Bansal et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0019695 A1* | 1/2004 | Fellenstein et al. .......... 709/239 |
| 2004/0024720 A1 | 2/2004 | Fairweather |
| 2004/0044647 A1 | 3/2004 | Salmenkaita |
| 2004/0054718 A1 | 3/2004 | Hicks, III et al. |
| 2004/0064528 A1 | 4/2004 | Meredith et al. |
| 2004/0068586 A1 | 4/2004 | Xie et al. |
| 2004/0093381 A1 | 5/2004 | Hodges et al. |
| 2004/0093593 A1 | 5/2004 | Jhanwar et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0133627 A1 | 7/2004 | Kalyanaraman et al. |
| 2004/0139319 A1 | 7/2004 | Favazza et al. |
| 2004/0148334 A1 | 7/2004 | Arellano et al. |
| 2004/0153545 A1 | 8/2004 | Pandaya et al. |
| 2004/0161090 A1 | 8/2004 | Digate et al. |
| 2004/0162881 A1 | 8/2004 | Digate et al. |
| 2004/0176988 A1 | 9/2004 | Boughannam |
| 2004/0221005 A1 | 11/2004 | Albaugh et al. |
| 2005/0004974 A1 | 1/2005 | Sharma et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0068167 A1 | 3/2005 | Boyer et al. |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0114533 A1* | 5/2005 | Hullfish ................ H04L 12/581 709/230 |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0204391 A1 | 9/2005 | Hunleth et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031441 A1 | 2/2006 | Davis et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0047753 A1 | 3/2006 | Pal |
| 2006/0048159 A1 | 3/2006 | Yazawa et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0112400 A1 | 5/2006 | Zhang et al. |
| 2006/0116912 A1 | 6/2006 | Maes |
| 2006/0117109 A1 | 6/2006 | Maes |
| 2006/0117376 A1 | 6/2006 | Maes |
| 2006/0136560 A1* | 6/2006 | Jiang ............................ 709/206 |
| 2006/0143622 A1 | 6/2006 | Prabandham et al. |
| 2006/0143686 A1 | 6/2006 | Maes |
| 2006/0146792 A1 | 7/2006 | Ramachandran et al. |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0047534 A1 | 3/2007 | Hakusui |
| 2007/0061397 A1 | 3/2007 | Gregorat et al. |
| 2007/0071224 A1* | 3/2007 | Shtivelman et al. .... 379/265.02 |
| 2007/0088836 A1 | 4/2007 | Tai et al. |
| 2007/0099613 A1 | 5/2007 | Burgan et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0117556 A1 | 5/2007 | Rogalski |
| 2007/0118618 A1 | 5/2007 | Kisel et al. |
| 2007/0118648 A1 | 5/2007 | Millefiorini et al. |
| 2007/0118662 A1 | 5/2007 | Vishwanathan et al. |
| 2007/0121539 A1 | 5/2007 | Kikuchi |
| 2007/0123297 A1 | 5/2007 | Chan et al. |
| 2007/0150480 A1 | 6/2007 | Hwang et al. |
| 2007/0150936 A1 | 6/2007 | Maes |
| 2007/0173226 A1 | 7/2007 | Cai et al. |
| 2007/0182541 A1 | 8/2007 | Harris et al. |
| 2007/0189466 A1 | 8/2007 | Croak et al. |
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0198982 A1 | 8/2007 | Bolan et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0255662 A1 | 11/2007 | Tumminaro |
| 2007/0271554 A1 | 11/2007 | Fletcher et al. |
| 2007/0276907 A1 | 11/2007 | Maes |
| 2007/0280226 A1 | 12/2007 | Sonalkar et al. |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0043975 A1* | 2/2008 | Miloslavsky et al. ........ 379/219 |
| 2008/0049929 A1* | 2/2008 | Miloslavsky et al. ... 379/265.12 |
| 2008/0080479 A1 | 4/2008 | Maes |

(56) References Cited

U.S. PATENT DOCUMENTS

| | | |
|---|---|---|
| 2008/0085712 A1 | 4/2008 | Han |
| 2008/0095326 A1 | 4/2008 | Qi et al. |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0147799 A1 | 6/2008 | Morris |
| 2008/0151768 A1 | 6/2008 | Liu |
| 2008/0151918 A1 | 6/2008 | Foti |
| 2008/0162637 A1 | 7/2008 | Adamczyk et al. |
| 2008/0163235 A1 | 7/2008 | Marvin et al. |
| 2008/0168523 A1 | 7/2008 | Ansari et al. |
| 2008/0171549 A1* | 7/2008 | Hursey et al. ............... 455/445 |
| 2008/0172482 A1 | 7/2008 | Shah |
| 2008/0175251 A1 | 7/2008 | Oouchi et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0201715 A1 | 8/2008 | Breiter et al. |
| 2008/0212762 A1* | 9/2008 | Gray et al. ............... 379/211.01 |
| 2008/0222694 A1 | 9/2008 | Nakae |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0253543 A1* | 10/2008 | Aharon ............... 379/201.12 |
| 2008/0271039 A1 | 10/2008 | Rolia et al. |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0292074 A1* | 11/2008 | Boni ............... H04M 3/54 379/93.11 |
| 2008/0293389 A1* | 11/2008 | Chin et al. ............... 455/414.1 |
| 2008/0301135 A1 | 12/2008 | Alves et al. |
| 2008/0307108 A1 | 12/2008 | Yan et al. |
| 2008/0313648 A1 | 12/2008 | Wang et al. |
| 2009/0003362 A1 | 1/2009 | Pattabhiraman et al. |
| 2009/0006360 A1 | 1/2009 | Liao et al. |
| 2009/0015433 A1 | 1/2009 | James et al. |
| 2009/0022072 A1 | 1/2009 | Zhu et al. |
| 2009/0022286 A1* | 1/2009 | Brunson et al. ........... 379/88.12 |
| 2009/0034426 A1 | 2/2009 | Luft et al. |
| 2009/0086950 A1 | 4/2009 | Vendrow et al. |
| 2009/0093240 A1 | 4/2009 | Lang |
| 2009/0106677 A1 | 4/2009 | Son et al. |
| 2009/0109959 A1* | 4/2009 | Elliott et al. ............... 370/352 |
| 2009/0112875 A1 | 4/2009 | Maes |
| 2009/0119303 A1 | 5/2009 | Rio et al. |
| 2009/0119672 A1 | 5/2009 | Bussard et al. |
| 2009/0125595 A1 | 5/2009 | Maes |
| 2009/0132220 A1 | 5/2009 | Chakraborty et al. |
| 2009/0132717 A1 | 5/2009 | Maes |
| 2009/0154681 A1* | 6/2009 | Kung et al. ............... 379/211.02 |
| 2009/0180440 A1 | 7/2009 | Sengupta et al. |
| 2009/0185576 A1 | 7/2009 | Kisel et al. |
| 2009/0187919 A1 | 7/2009 | Maes |
| 2009/0190603 A1 | 7/2009 | Damola et al. |
| 2009/0192992 A1 | 7/2009 | Arthursson |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0222836 A1 | 9/2009 | Paval |
| 2009/0222858 A1 | 9/2009 | Hjelm et al. |
| 2009/0228584 A1 | 9/2009 | Maes et al. |
| 2009/0253434 A1 | 10/2009 | Hayashi et al. |
| 2009/0306834 A1 | 12/2009 | Hjelm et al. |
| 2009/0328051 A1 | 12/2009 | Maes |
| 2010/0037157 A1 | 2/2010 | Chang et al. |
| 2010/0049640 A1 | 2/2010 | Maes |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0091764 A1 | 4/2010 | Merino Gonzalez et al. |
| 2010/0128696 A1 | 5/2010 | Fantini et al. |
| 2010/0153865 A1 | 6/2010 | Barnes et al. |
| 2010/0179995 A1* | 7/2010 | Wang ............... G06Q 10/107 709/206 |
| 2010/0185772 A1 | 7/2010 | Wang et al. |
| 2010/0192004 A1 | 7/2010 | Bauchot et al. |
| 2010/0235844 A1 | 9/2010 | Arwe et al. |
| 2010/0281488 A1 | 11/2010 | Krishnamurthy et al. |
| 2011/0035443 A1 | 2/2011 | Jensen |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0134843 A1* | 6/2011 | Noldus et al. ............... 370/328 |
| 2011/0145278 A1 | 6/2011 | Maes |
| 2011/0145347 A1 | 6/2011 | Maes |
| 2011/0182205 A1 | 7/2011 | Gerdes et al. |
| 2011/0258619 A1 | 10/2011 | Wookey |
| 2011/0280383 A1* | 11/2011 | Varga et al. ............... 379/93.01 |
| 2012/0045040 A1 | 2/2012 | Maes |
| 2012/0047506 A1 | 2/2012 | Maes |
| 2012/0106728 A1* | 5/2012 | Ghaffari et al. ......... 379/211.02 |
| 2012/0173745 A1 | 7/2012 | Maes |

FOREIGN PATENT DOCUMENTS

| | | | |
|---|---|---|---|
| WO | 2008111027 | 12/2008 | |
| WO | WO -2008/146097 | * 12/2008 | ............... H04Q 7/22 |

OTHER PUBLICATIONS

U.S. Appl. No. 11/951,500, filed filed Dec. 6, 2007, Office Action mailed Apr. 11, 2012, 6 pages.
U.S. Appl. No. 11/070,317, filed Mar. 1, 2005, Office Action dated Mar. 15, 2012, 10 pages.
U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/019,335, filed Jan. 24, 2008, Advisory Action mailed Feb. 27, 2012, 3 pages.
U.S. Appl. No. 12/544,484, filed Aug. 20, 2009, Advisory Action dated Feb. 9, 2012, 2 pages.
U.S. Appl. No. 11/949,930, filed Dec. 4, 2007, Notice of Allowance mailed Mar. 19, 2012, 19 pages.
U.S. Appl. No. 12/014,387, filed Jan. 15, 2008, Final Office Action mailed Apr. 5, 2012, 17 pages.
U.S. Appl. No. 12/018,718, filed Jan. 23, 2008, Final Office Action mailed Feb. 1, 2012, 30 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 11/024,160, filed Dec. 27, 2004, Maes.
Andrews, Tony et al., Business Process Execution Language for Web Services, Version 1.1, BEA Systems, International Business Machines Corporation, SAP AG, Siebel Systems, May 5, 2003, 31 pages.
Burger, E. et al., "Deploying CCXML for Application-Layer Call Control," Aug. 2006, 11 pages.
International Search Report and Written Opinion of PCT/US2010/037074 mailed Jun. 1, 2011, 16 pages.
Kim et al., "Implementation of Third Party Based Call Control using Parlay Network API in SIP Environment," ICOIN 2003, LNCS 2662, 2003, pp. 416-425.
Liberty Architecture Overview, Liberty Alliance Project Version 1.1, Piscataway New Jersey, Jan. 15, 2003, 44 pages.
Maes, Stephane, Multi-modal Browser Architecture, Overview on the support of multi-modal browsers in 3GPP, IBM Research Mobile Speech Solutions and Conversational Multi-modal Computing, http://www.w3.org, accessed May 26, 2003, 25 pages.

(56) References Cited

OTHER PUBLICATIONS

Maes, Stephane, Multi-modal Web IBM Position W3C/WAP Workshop, IBM Research Human Language Technologies, http://www.w3.org, accessed May 26, 2003, 9 pages.

Maretzke, Michael, "JAIN SLEE Technology Overview," <http://www.maretzke.de/pub/lectures/jslee_overview_2005/JSLEE_Overview_2005.pdf>, Apr. 12, 2005, 26 pages.

O'Doherty, Phelim, "JSLEE—SIP Servlet," <http://java.sun.com/products/jain/JSLEE-SIPServlet.pdf, 2003, 13 pages.

Parlay APIs 4.0, Parlay X Web Services White Paper, The Parlay Group, Parlay X Working Group, Dec. 16, 2002, 12 pages.

Policy-Based Management Tom Sheldon's Linktionary, http://www.linktionary.com/policy.html, accessed Aug. 2, 2004, 4 pages.

Romellini, C. et al., "CCXML: The Power of Standardization," Loquendo, Sep. 27, 2005, 7 pages.

Seely, Scott, "XML and Web Services Security: Understanding WS-Security," Microsoft Corporation, 2002, 11 pages.

Simpson et al., Java Product Review—Oracle EDA Suite, Dec. 4, 2006, Open Source Magazine, pp. 1-10.

Single Sign on Deployment Guide, Introduction to Single-Sign-On, Netscape 6 Documentation Training Manual http://developer.netscape.com/docs/manuals/security/SSO/sso.htm, accessed May 26, 2003, 5 Pages.

Sundsted, Todd E., With Liberty and single sign-on for all, The Liberty Alliance Project seeks to solve the current online identity crisis Java World, www.javaworld.com/javaworld/jw-02-2002/jw-0215-liberty.html, accessed May 26, 2003, 7 pages.

The Parlay Group, "Specifications," <http://web.archive.org/web/20050114014707/www.parlay.org/specs/index.asp>, Jan. 14, 2005, 2 pages.

Thomas, Ann M., "Registering a Web Service in UDDI," SOA World Magazine, Sep. 26, 2003, 9 pages.

U.S. Appl. No. 11/848,347, filed Aug. 31, 2007, Advisory Action mailed Jul. 27, 2010, 3 pages.

U.S. Appl. No. 11/848,347, filed Aug. 31, 2007, Final Office Action mailed May 10, 2010, 15 pages.

U.S. Appl. No. 11/848,347, filed Aug. 31, 2007, Office Action mailed Oct. 29, 2009, 12 pages.

U.S. Appl. No. 11/848,347, filed Aug. 31, 2007, Office Action mailed Sep. 30, 2010, 19 pages.

U.S. Appl. No. 11/848,347, filed Aug. 31, 2007, Final Office Action mailed Mar. 7, 2011, 21 pages.

U.S. Appl. No. 11/848,347, filed Aug. 31, 2007, Advisory Action mailed May 23, 2011, 3 pages.

U.S. Appl. No. 11/877,129, filed Oct. 23, 2007, Advisory Action mailed Jun. 3, 2010, 2 pages.

U.S. Appl. No. 11/877,129, filed Oct. 23, 2007, Final Office Action mailed Mar. 29, 2010, 17 pages.

U.S. Appl. No. 11/877,129, filed Oct. 23, 2007, Notice of Allowance mailed Aug. 5, 2010, 6 pages.

U.S. Appl. No. 11/877,129, filed Oct. 23, 2007, Office Action mailed Sep. 28, 2009, 15 pages.

U.S. Appl. No. 11/926,738, filed Oct. 29, 2007, Final Office Action mailed Jun. 29, 2010, 12 pages.

U.S. Appl. No. 11/926,738, filed Oct. 29, 2007, Office Action mailed Feb. 24, 010, 12 pages.

U.S. Appl. No. 11/926,738, filed Oct. 29, 2007, Advisory Action mailed Sep. 3, 2010, 2 pages.

U.S. Appl. No. 11/926,738, filed Oct. 29, 2007, Office Action mailed Nov. 10, 2010, 12 pages.

U.S. Appl. No. 11/926,738, filed Oct. 29, 2007, Final Office Action mailed Mar. 17, 2011, 13 pages.

U.S. Appl. No. 11/926,738, filed Oct. 29, 2007, Advisory Action mailed May 25, 2011, 3 pages.

U.S. Appl. No. 11/943,101, filed Nov. 20, 2007, Advisory Action mailed Apr. 16, 2010, 3 pages.

U.S. Appl. No. 11/943,101, filed Nov. 20, 2007, Final Office Action mailed Feb. 2, 2010, 9 pages.

U.S. Appl. No. 11/943,101, filed Nov. 20, 2007, Office Action mailed Jul. 8, 2009, 9 pages.

U.S. Appl. No. 11/943,101, filed Nov. 20, 2007, Office Action mailed Aug. 27, 2010, 11 pages.

U.S. Appl. No. 11/943,101, filed Nov. 20, 2007, Final Office Action mailed Feb. 14, 2011, 11 pages.

U.S. Appl. No. 11/943,101, filed Nov. 20, 2007, Advisory Action mailed Apr. 28, 2011, 3 pages.

U.S. Appl. No. 11/951,500, filed Dec. 6, 2007, Advisory Action mailed Jun. 24, 2010, 2 pages.

U.S. Appl. No. 11/951,500, filed Dec. 6, 2007, Final Office Action mailed Mar. 30, 2010, 26 pages.

U.S. Appl. No. 11/951,500, filed Dec. 6, 2007, Office Action mailed Sep. 22, 2009, 24 pages.

U.S. Appl. No. 11/951,500, filed Dec. 6, 2007, Office Action mailed Sep. 1, 2010, 30 pages.

U.S. Appl. No. 11/951,500, filed Dec. 6, 2007, Final Office Action mailed Apr. 14, 2011, 33 pages.

U.S. Appl. No. 10/855,999, filed May 28, 2004, Advisory Action dated Feb. 16, 2010, 3 pages.

U.S. Appl. No. 10/855,999, filed May 28, 2004, Advisory Action dated Feb. 2, 2009, 3 pages.

U.S. Appl. No. 10/855,999, filed May 28, 2004, Final Office Action dated Nov. 19, 2008, 12 pages.

U.S. Appl. No. 10/855,999, filed May 28, 2004, Final Office Action dated Nov. 23, 2009, 19 pages.

U.S. Appl. No. 10/855,999, filed May 28, 2004, Office Action dated Apr. 15, 2009, 13 pages.

U.S. Appl. No. 10/855,999, filed May 28, 2004, Office Action dated May 1, 2008, 9 pages.

U.S. Appl. No. 10/855,999, filed May 28, 2004, Office Action dated Jun. 24, 2010, 20 pages.

U.S. Appl. No. 10/855,999, filed May 28, 2004, Final Office Action dated Jan. 5, 2011, 19 pages.

U.S. Appl. No. 10/855,999, filed May 28, 2004, Advisory Action dated Mar. 16, 2011, 3 pages.

U.S. Appl. No. 10/856,588, filed May 28, 2004, Advisory Action dated Jan. 5, 2010, 3 pages.

U.S. Appl. No. 10/856,588, filed May 28, 2004, Final Office Action dated Oct. 15, 2008, 11 pages.

U.S. Appl. No. 10/856,588, filed May 28, 2004, Final Office Action dated Oct. 20, 2009, 17 pages.

U.S. Appl. No. 10/856,588, filed May 28, 2004, Notice of Allowance dated Sep. 23, 2010, 8 pages.

U.S. Appl. No. 10/856,588, filed May 28, 2004, Office Action dated Mar. 16, 2009, 10 pages.

U.S. Appl. No. 10/856,588, filed May 28, 2004, Office Action dated Apr. 11, 2008, 16 pages.

U.S. Appl. No. 11/070,317, filed Mar. 1, 2005, Advisory Action dated May 19, 2009, 3 pages.

U.S. Appl. No. 11/070,317, filed Mar. 1, 2005, Final Office Action dated Feb. 2, 2010, 8 pages.

U.S. Appl. No. 11/070,317, filed Mar. 1, 2005, Final Office Action dated Mar. 4, 2009, 16 pages.

U.S. Appl. No. 11/070,317, filed Mar. 1, 2005, Final Office Action dated Sep. 27, 2010, 8 pages.

U.S. Appl. No. 11/070,317, filed Mar. 1, 2005, Office Action dated Apr. 30, 2010, 9 pages.

U.S. Appl. No. 11/070,317, filed Mar. 1, 2005, Office Action dated Aug. 18, 2009, 21 pages.

U.S. Appl. No. 11/070,317, filed Mar. 1, 2005 Office Action dated Aug. 5, 2008, 18 pages.

U.S. Appl. No. 11/024,160, filed Dec. 27, 2004, Office Action dated Feb. 7, 2011, 11 pages.

U.S. Appl. No. 11/024,160, filed Dec. 27, 2004, Advisory Action dated Feb. 18, 2010, 3 pages.

U.S. Appl. No. 11/024,160, filed Dec. 27, 2004, Final Office Action dated Oct. 15, 2010, 11 pages.

U.S. Appl. No. 11/024,160, filed Dec. 27, 2004, Final Office Action dated Dec. 3, 2009, 11 pages.

U.S. Appl. No. U.S. Appl. No. 11/024,160, filed Dec. 27, 2004, Final Office Action dated Feb. 11, 2009, 9 pages.

U.S. Appl. No. 11/024,160, filed Dec. 27, 2004, Office Action dated Jun. 29, 2009, 9 pages.

(56) References Cited

OTHER PUBLICATIONS

U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/024,160, filed Dec. 27, 2004, Final Office Action dated Jun. 1, 2011, 11 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 10, 2010, 18 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Advisory Action dated Jan. 18, 2011, 2 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 11/939,705, filed Nov. 14, 2007, Office Action mailed Oct. 4, 2010, 21 pages.
U.S. Appl. No. 11/939,705, filed Nov. 14, 2007, Final Office Action mailed Mar. 17, 2011, 21 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 12/019,335, filed Jan. 24, 2008, Office Action mailed May 23, 2011, 18 pages.
U.S. Appl. No. 12/364,642, filed Feb. 3, 2009, Office Action dated Dec. 20, 2010, 18 pages.
U.S. Appl. No. 11/357,653, filed Feb. 16, 2006, Office Action dated Jan. 20, 2011, 18 pages.
U.S. Appl. No. 12/544,459, filed Aug. 20, 2009, Office Action mailed Mar. 2, 2011, 10 pages.
U.S. Appl. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Final Office Action mailed Oct. 6, 2010, 20 pages.
U.S. Appl. No. 12/019,299, filed Jan. 24, 2008, Office Action mailed Mar. 31, 2010, 13 pages.
U.S. Appl. No. 12/019,299, filed Jan. 24, 2008, Office Action mailed Jan. 24, 2011, 16 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
U.S. Appl. No. 11/951,500, filed Dec. 6, 2007.
U.S. Appl. No. 10/855,999, filed May 28, 2004.
U.S. Appl. No. 11/070,317, filed Mar. 1, 2005.
U.S. Appl. No. 11/123,468, filed May 5, 2005.
U.S. Appl. No. 11/939,705, filed Nov. 14, 2007.
U.S. Appl. No. 12/045,220, filed Mar. 10, 2008.
U.S. Appl. No. 12/019,335, filed Jan. 24, 2008.
U.S. Appl. No. 12/364,642, filed Feb. 3, 2009.
U.S. Appl. No. 11/357,653, filed Feb. 16, 2006.
U.S. Appl. No. 12/544,471, filed Aug. 20, 2009.
U.S. Appl. No. 12/544,484, filed Aug. 20, 2009.
U.S. Appl. No. 12/490,540, filed Jun. 24, 2009.
U.S. Appl. No. 11/949,930, filed Dec. 4, 2007.
U.S. Appl. No. 11/969,343, filed Jan. 4, 2008.
U.S. Appl. No. 12/014,387, filed Jan. 15, 2008.
U.S. Appl. No. 12/018,718, filed Jan. 23, 2008.
U.S. Appl. No. 12/019,299, filed Jan. 24, 2008.
U.S. Appl. No. 12/948,247, filed Nov. 17, 2010.
U.S. Appl. No. 12/948,450, filed Nov. 17, 2010.
U.S. Appl. No. 12/949,287, filed Nov. 18, 2010.
U.S. Appl. No. 12/791,129, filed Jun. 1, 2010.
U.S. Appl. No. 12/949,183, filed Nov. 18, 2010.
U.S. Appl. No. 13/029,219, filed Feb. 17, 2011.
U.S. Appl. No. 13/029,226, filed Feb. 17, 2011.
U.S. Appl. No. 12/957,740, filed Dec. 1, 2010.
U.S. Appl. No. 13/416,413, filed Mar. 9, 2012.
U.S. Appl. No. 11/951,500, filed Dec. 6, 2007, Notice of Allowance mailed Jul. 23, 2012, 7 pages.
U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/019,299, filed Jan. 24, 2008, Final Office Action mailed Aug. 15, 2012, 19 pages.
U.S. Appl. No. 13/416,413, filed Mar. 9, 2012, Notice of Allowance mailed Oct. 2, 2012, 5 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Office Action mailed Jul. 28, 2011, 11 pages.
U.S. Appl. No. 11/951,500, filed Dec. 6, 2007, Advisory Action mailed Jul. 15, 2011, 3 pages.
U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 12/045,220, filed Mar. 10, 2008, Office Action dated Sep. 27, 2011, 20 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Advisory Action dated Sep. 16, 2011, 3 pages.
U.S. Appl. No. 11/357,653, filed Feb. 16, 2006, Final Office Action dated Aug. 2, 2011, 19 pages.
U.S. Appl. No. 12/544,459, filed Aug. 20, 2009, Notice of Allowance mailed Aug. 22, 2011, 8 pages.
U.S. Appl. No. 11/949,930, filed Dec. 4, 2007, Office Action mailed Sep. 29, 2011, 19 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.
U.S. Appl. No. 11/939,705, filed Nov. 14, 2007, Notice of Allowance mailed May 15, 2013, 92 pages.
U.S. Appl. No. 12/018,718, filed Jan. 23, 2008, Non-Final Office Action mailed Apr. 24, 2013, 114 pages.
U.S. Appl. No. 12/948,450, filed Nov. 17, 2010, Notice of Allowance mailed May 10, 2013, 28 pages.

(56) References Cited

OTHER PUBLICATIONS

U.S. Appl. No. 12/949,183, filed Nov. 18, 2010, Final Office Action mailed Apr. 17, 2013, 30 pages.
U.S. Appl. No. 12/949,287, filed Nov. 18, 2010, Final Office Action mailed Apr. 23, 2013, 28 pages.
U.S. Appl. No. 12/957,740, filed Dec. 1, 2010, Advisory Action mailed May 21, 2013, 13 pages.
U.S. Appl. No. 13/029,226, filed Feb. 17, 2011, Non-Final Office Action mailed May 28, 2013, 47 pages.
3rd Generation Partnership Project 2, "Presence Service: Architecture and Functional Description", doc. No. 3GPP2 X.S0027-001-0, published on Sep. 2004, 32 pages.
Day, et al., "RFC 2778, A Model for Presence and Instant Messaging", published on Feb. 2000, 12 pages.
U.S. Appl. No. 10/855,999, filed May 28, 2004, Non-Final Office Action dated Mar. 28, 2013, 42 pages.
U.S. Appl. No. 10/855,999, filed May 28, 2004, Advisory Action dated Mar. 18, 2011, 5 pages.
U.S. Appl. No. 11/070,317, filed Mar. 1, 2005, Notice of Allowance dated Oct. 19, 2012, 11 pages.
U.S. Appl. No. 11/939,705, filed Nov. 14, 2007, Final Office Action mailed Dec. 5, 2012, 18 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 12/019,299, filed Jan. 24, 2008, Advisory Action mailed Oct. 29, 2012, 3 pages.
U.S. Appl. No. 12/019,299, filed Jan. 24, 2008, Non Final Office Action mailed Dec. 7, 2012, 21 pages.
U.S. Appl. No. 12/948,247, filed Nov. 17, 2010, Final Office Action mailed Feb. 11, 2013, 25 pages.
U.S. Appl. No. 12/791,129, filed Jun. 1, 2010, Final Office Action mailed Dec. 7, 2012, 9 pages.
U.S. Appl. No. 12/948,450, filed Nov. 17, 2010, Non-Final Office Action mailed Nov. 7, 2012, 48 pages.
U.S. Appl. No. 12/949,183, filed Nov. 18, 2010, Non-final Office Action mailed Nov. 16, 2012, 69 pages.
U.S. Appl. No. 12/957,740, filed Dec. 1, 2010, Non-final Office Action mailed Oct. 17, 2012, 52 pages.
U.S. Appl. No. 12/957,740, filed Dec. 1, 2010, Final Office Action mailed Feb. 15, 2013, 25 pages.
U.S. Appl. No. 13/029,219, filed Feb. 17, 2011, Non-Final Office Action mailed Mar. 20, 2013, 65 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/943,101, filed Nov. 20, 2007, Notice of Allowance mailed Dec. 9, 2011, 7 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Advisory Action dated Oct. 12, 2011, 3 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.
U.S. Appl. No. 12/019,335, filed Jan. 24, 2008, Final Office Action mailed Jan. 14, 2014, 33 pages.
U.S. Appl. No. 11/969,343, filed Jan. 4, 2008, Notice of Allowance mailed Jan. 16, 2014, 6 pages.
U.S. Appl. No. 12/791,129, filed Jun. 1, 2010, Final Office Action mailed Dec. 20, 2013, 10 pages.
U.S. Appl. No. 13/029,219, filed Feb. 17, 2011, Advisory Action mailed Jan. 2, 2014, 3 pages.
U.S. Appl. No. 10/855,999, filed May 28, 2004, Final Office Action dated Nov. 18, 2013, 14 pages.
U.S. Appl. No. 12/045,220, filed Mar. 10, 2008, Non-Final Office Action dated Oct. 7, 2013, 19 pages.
U.S. Appl. No. 11/357,653, filed Feb. 16, 2006, Non-final Office Action dated Jul. 11, 2013, 26 pages.
U.S. Appl. No. 11/357,653, filed Feb. 16, 2006, Final Office Action dated Nov. 26, 2013, 25 pages.
U.S. Appl. No. 12/014,387, filed Jan. 15, 2008, Notice of Allowance mailed Oct. 25, 2013, 17 pages.
U.S. Appl. No. 12/018,718, filed Jan. 23, 2008, Final Office Action mailed Sep. 10, 2013, 55 pages.
U.S. Appl. No. 12/018,718, filed Jan. 23, 2008, Advisory Action mailed Nov. 15, 2013, 3 pages.
U.S. Appl. No. 12/791,129, filed Jun. 1, 2010, Non-Final Office Action mailed Sep. 11, 2013, 10 pages.
U.S. Appl. No. 12/949,183, filed Nov. 18, 2010, Advisory Action mailed Jun. 28, 2013, 3 pages.
U.S. Appl. No. 12/949,183, filed Nov. 18, 2010, Non-Final Office Action mailed Sep. 9, 2013, 18 pages.
U.S. Appl. No. 12/949,287, filed Nov. 18, 2010, Non-final Office Action mailed Aug. 8, 2013, 24 pages.
U.S. Appl. No. 12/949,287, filed Nov. 18, 2010, Final Office Action mailed Nov. 25, 2013, 25 pages.
U.S. Appl. No. 12/957,740, filed Dec. 1, 2010, Non-final Office Action mailed Aug. 15, 2013, 17 pages.
U.S. Appl. No. 13/029,219, filed Feb. 17, 2011, Final Office Action mailed Oct. 11, 2013, 22 pages.
U.S. Appl. No. 11/357,653, Non-Final Office Action mailed on Mar. 27, 2014, 19 pages.
U.S. Appl. No. 11/969,343, Notice of Allowance mailed on Apr. 9, 2014, 6 pages.
U.S. Appl. No. 12/014,387, Corrective Notice of Allowance mailed on Dec. 18, 2013, 4 pages.
U.S. Appl. No. 12/019,299, Notice of Allowance mailed on, Jul. 3, 2013, 6 pages.
U.S. Appl. No. 12/019,335, Final Office Action mailed on Jul. 26, 2013, 19 pages.
U.S. Appl. No. 12/045,220, Final Office Action mailed on Apr. 18, 2014, 20 pages.
U.S. Appl. No. 12/544,484, Non-Final Office Action mailed on May 8, 2014, 13 pages.
U.S. Appl. No. 12/791,129, Advisory Action mailed on Mar. 6, 2014, 3 pages.
U.S. Appl. No. 12/791,129, Notice of Allowance mailed on Apr. 24, 2014, 9 pages.
U.S. Appl. No. 12/949,183, Final Office Action mailed on Jan. 21, 2014, 16 pages.
U.S. Appl. No. 12/949,183, Advisory Action mailed on Apr. 10, 2014, 3 pages.
U.S. Appl. No. 12/949,287, Non-Final Office Action mailed on Nov. 19, 2012, 32 pages.
U.S. Appl. No. 12/957,740, Final Office Action mailed on Feb. 19, 2014, 18 pages.
U.S. Appl. No. 13/029,219, Non-Final Office Action mailed on Apr. 11, 2014, 23 pages.
U.S. Appl. No. 13/029,226, Final Office Action mailed on Jan. 30, 2014, 12 pages.
U.S. Appl. No. 13/029,226, Advisory Action mailed on Apr. 7, 2014, 3 pages.

(56) References Cited

OTHER PUBLICATIONS

U.S. Appl. No. 11/123,468, Non-Final Office Action mailed on Jun. 10, 2014, 18 pages.
U.S. Appl. No. 12/019,335, Notice of Allowance mailed on Jun. 11, 2014, 7 pages.
U.S. Appl. No. 12/948,247, Non-Final Office Action mailed on May 21, 2014, 18 pages.
U.S. Appl. No. 12/957,740, Advisory Action mailed on May 23, 2014, 3 pages.
U.S. Appl. No. 13/029,226, Non-Final office Action mailed on May 22, 2014, 12 pages.
Maffioletti et al., Automatic resource and service management for ubiquitous computing environments, Pervasive Computing and Communications Workshops. Proceedings of the Second IEEE Annual Conference on. IEEE, 2004.
Simon et al., A simple query interface for interoperable learning repositories, In Proceedings of the 1st Workshop on Interoperability of Web-based Educational Systems, 2005, pp. 11-18.
U.S. Appl. No. 11/357,653, Final Office Action mailed on Aug. 18, 2014, 15 pages.
U.S. Appl. No. 12/018,718, Non-Final Office Action mailed on Sep. 30, 2014, 50 pages.
U.S. Appl. No. 12/045,220, Notice of Allowance mailed on Aug. 13, 2014, 5 pages.
U.S. Appl. No. 12/544,484, Non-Final Office Action mailed on Aug. 1, 20014, 14 pages.
U.S. Appl. No. 12/791,129, Corrected Notice of Allowability mailed on Oct. 6, 2014, 6 pages.
U.S. Appl. No. 12/949,183, Non-Final Office Action mailed on Sep. 22, 2014, 16 pages.
U.S. Appl. No. 12/949,287, Non-Final Office Action mailed on Sep. 8, 2014, 27 pages.
U.S. Appl. No. 13/029,219, Final Office Action mailed on Sep. 12, 2014, 24 pages.
U.S. Appl. No. 11/123,468, Non-Final Office Action mailed on Jan. 30, 2015, 19 pages.
U.S. Appl. No. 12/544,484, Final Office Action mailed on Dec. 26, 2014, 12 pages.
U.S. Appl. No. 12/948,247, Final Office Action mailed on Nov. 25, 2014, 20 pages.
U.S. Appl. No. 12/949,183, Final Office Action mailed on Jan. 22, 2015, 16 pages.
U.S. Appl. No. 12/949,287, Final Office Action mailed on Dec. 23, 2014, 27 pages.
U.S. Appl. No. 13/029,219, Notice of Allowance mailed on Jan. 22, 2015, 12 pages.
U.S. Appl. No. 13/029,226, Final Office Action mailed on Jan. 8, 2015, 13 pages.
U.S. Appl. No. 12/544,484, Advisory Action mailed on Mar. 10, 2015, 3 pages.
U.S. Appl. No. 12/948,247, Advisory Action mailed on Mar. 6, 2015, 3 pages.
U.S. Appl. No. 12/949,183, Advisory Action mailed on Mar. 26, 2015, 3 pages.
U.S. Appl. No. 12/949,287, Advisory Action mailed on Mar. 10, 2015, 3 pages.
U.S. Appl. No. 12/957,740, Non-Final Office Action mailed on Feb. 13, 2015, 17 pages.
U.S. Appl. No. 13/029,226, Advisory Action mailed on Mar. 25, 2015, 2 pages.
U.S. Appl. No. 10/855,999, Non-Final Office Action mailed on Jun. 17, 2015, 16 pages.
U.S. Appl. No. 12/018,718, Final Office Action mailed on Jun. 30, 2015, 22 pages.
U.S. Appl. No. 13/029,226, Non-Final Office Action mailed on Jun. 19, 2015, 13 pages.
U.S. Appl. No. 11/357,653, Notice of Allowance mailed on Oct. 5, 2015, 16 pages.
U.S. Appl. No. 11/357,653, Notice of Allowance mailed on Sep. 11, 2015, 19 pages.
U.S. Appl. No. 12/948,247, Notice of Allowance mailed on Oct. 13, 2015, 8 pages.
U.S. Appl. No. 12/949,183, Non-Final Office Action mailed on Sep. 16, 2015, 15 pages.
U.S. Appl. No. 12/949,287, Non-Final Office Action mailed on Sep. 18, 2015, 29 pages.
U.S. Appl. No. 12/957,740, Final Office Action mailed on Aug. 12, 2015, 18 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 11/357,653, filed Feb. 16, 2006, Office Action dated Apr. 26, 2012, 18 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.
U.S. Appl. No. 12/018,718, Final Office Action, mailed on Aug. 25, 2016, 29 pages.

* cited by examiner

MESSAGE FORWARDING

RELATED APPLICATIONS

The present application claims benefit under 35 USC 119(e) of U.S. Provisional Application No. 61/286,981, filed on Dec. 16, 2009 by Maes et al. and entitled "Message Forwarding," of which the entire disclosure is incorporated herein by reference for all purposes.

This application is also related to U.S. patent application Ser. No. 11/939,705 filed Nov. 14, 2007 by Maes and entitled "Intelligent Message Processing" of which the entire disclosure is incorporated herein by reference for all purposes.

BACKGROUND OF THE INVENTION

The present invention relates generally to electronic messaging, and in particular to the processing and routing of messages across a network.

As communications increasingly are done electronically, the number of messaging types and devices, as well as the complexity of those messages, is increasing accordingly. Messaging can be done through different messaging channels, such as email, voice messaging, multimedia messaging, video messaging, Short Message Service (SMS), Multimedia Messaging Service (MMS), instant messaging, fax, and print exchange messaging. As such, it is desirable to be able to send and/or receive messages using any of the increasing number of channels, as well as to be able to send messages over different channels.

However, communication systems today do not support all of the functions or features that a user may find desirable or useful. For example, today's communication systems and services do not provide a convenient way in which to forward messages across different channels. Furthermore, not all communication channels provide message forwarding, even on the same channel. For example, today's communication services and systems do not provide a way to forward an SMS message. Hence, there is a need for improved methods and systems for forwarding various types of communication messages and, in some cases, across different communication channels.

BRIEF SUMMARY OF THE INVENTION

Embodiments of the invention provide systems and methods for forwarding various types of communication messages and, in some cases, across different communication channels. According to one embodiment, a method of handling a communication can comprise receiving one or more forwarding instructions and storing the one or more forwarding instructions. Receiving the one or more forwarding instructions can comprise receiving the one or more forwarding instructions from a service provider, from the first user, or from another entity. Receiving the one or more forwarding instructions can comprise receiving the one or more forwarding instructions via an Interactive Voice Response (IVR) system, via a web site, from a device of the first user, or from or through another interface, device, or system.

A message from a first user to a second user at a first address can be intercepted. The message can comprise a voice call, an email, a Short Message Service (SMS) message, a Multimedia Messaging Service (MMS) message, an Instant Message (IM), or another type of message. The one or more stored forwarding instructions can be applied to the message to determine at least one second address. In some cases, the at least one second address can comprise a plurality of addresses. In some cases, the first address can be on a first communication channel and the second address can be on a second communication channel. The message can be forwarded to the second user at the second address.

According to another embodiment, a system can comprise a communication network and a first device communicatively coupled with the communication network. The first device can be adapted to send a first message to a first address via the communication network. A second device can be communicatively coupled with the communication network. A service provider system can also be communicatively coupled with the communication network. The service provider system can be adapted to receive one or more forwarding instructions, store the one or more forwarding instructions, intercept a message from the first device to the second device at a first address, apply one or more stored forwarding instructions to the message to determine at least one second address, and forward the message to the second device at the second address. In some cases, the at least one second address comprises a plurality of addresses. Additionally or alternatively, the first address can be on a first communication channel and the second address can be on a second communication channel. The message can comprise a voice call, an email, a Short Message Service (SMS) message, a Multimedia Messaging Service (MMS) message, an Instant Message (IM), or another type of message.

In some cases, the service provider system can comprise a messaging enabler communicatively coupled with the communication network. In such cases, intercepting the message from the first device to the second device and forwarding the message to the second device can be performed by the messaging enabler. The service provider system can further comprise an application communicatively coupled with the messaging enabler. In such cases, applying the one or more stored forwarding instructions to the message to determine at least one second address can be performed by the application.

In some cases, the service provider system can comprise an Interactive Voice Response (IVR) system. In such cases, receiving the one or more forwarding instructions can comprise receiving the one or more forwarding instructions via the IVR system. Additionally or alternatively, the service provider system can receive the one or more forwarding instructions via a web site, from the first device, or from another interface, device, or system.

According to yet another embodiment, a machine-readable medium can have stored thereon a series of instructions which, when executed by a processor, cause the processor to handle a communication by receiving one or more forwarding instructions, storing the one or more forwarding instructions, intercepting a message from a first user to a second user at a first address, applying one or more stored forwarding instructions to the message to determine at least one second address, and forwarding the message to the second user at the second address. In some cases, the at least one second address can comprise a plurality of addresses. Additionally or alternatively, the first address can be on a first communication channel and the second address can be on a second communication channel. The message can comprise a voice call, an email, a Short Message Service (SMS) message, a Multimedia Messaging Service (MMS) message, an Instant Message (IM), or another type of message.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof When implemented in software, firmware, middleware or microcode, the program code or code segments to perform the necessary tasks may be stored in a machine readable medium. A processor(s) may perform the necessary tasks.

Embodiments of the invention provide systems and methods for a handling a message that may be used, for example, to provide a message forwarding service. Such a service may be implemented based on the methods and systems described in the Related Application and adapted to receive or set one or more target addresses or forwarding instructions that are then used to deliver or forward messages to intended recipients. The target addresses or forwarding instructions can be set by any of a number of entities. In one case, the recipient may set one or more target addresses or forwarding instructions to forward incoming messages to any of one or more addresses. So for example, when the recipient is out of office, traveling, etc., the recipient may access the message forwarding service and set a forwarding address via a web page or Interactive Voice Response (IVR) system of the message forwarding service to forward incoming messages to one or more different addresses, i.e., different device(s), account(s), service(s), channel(s), etc. In another case, the service may set one or more target addresses or forwarding instructions for a device or recipient. So for example, the service can set target addresses to affect number portability when a customer changes carriers or services. In another example, the target addresses can be determined based on presence information such as described in U.S. patent application Ser. No. 11/424,451 filed Jun. 15, 2006 by Maes and entitled "Past Presence Hints" of which the entire disclosure is incorporated herein by reference for all purposes. In yet another case, the recipient or other party, likely after proper authentication and authorization, can set target addresses or forwarding instructions for a device or recipient. It should be understood that these different cases for setting target addresses or forwarding instructions are not mutually exclusive and can be implemented in various combinations.

More specifically, embodiments of the present invention provide for handling a communication, for example to provide a forwarding service. According to one embodiment, handling a communication can comprise receiving one or more forwarding instructions and storing the one or more forwarding instructions. Receiving the one or more forwarding instructions can comprise receiving the one or more forwarding instructions from a service provider, from the first user, or from another entity. Receiving the one or more forwarding instructions can comprise receiving the one or more forwarding instructions via an Interactive Voice Response (IVR) system, via a web site, from a device of the first user, or from or through another interface, device, or system.

A message from a first user to a second user at a first address can be intercepted. The message can comprise a voice call, an email, a Short Message Service (SMS) message, a Multimedia Messaging Service (MMS) message, an Instant Message (IM), or another type of message. The one or more stored forwarding instructions can be applied to the message to determine at least one second address. In some cases, the at least one second address can comprise a plurality of addresses. In some cases, the first address can be on a first communication channel and the second address can be on a second communication channel. The message can be forwarded to the second user at the second address. Various additional details of embodiments of the present invention will be described below with reference to the figures.

Figure 1:
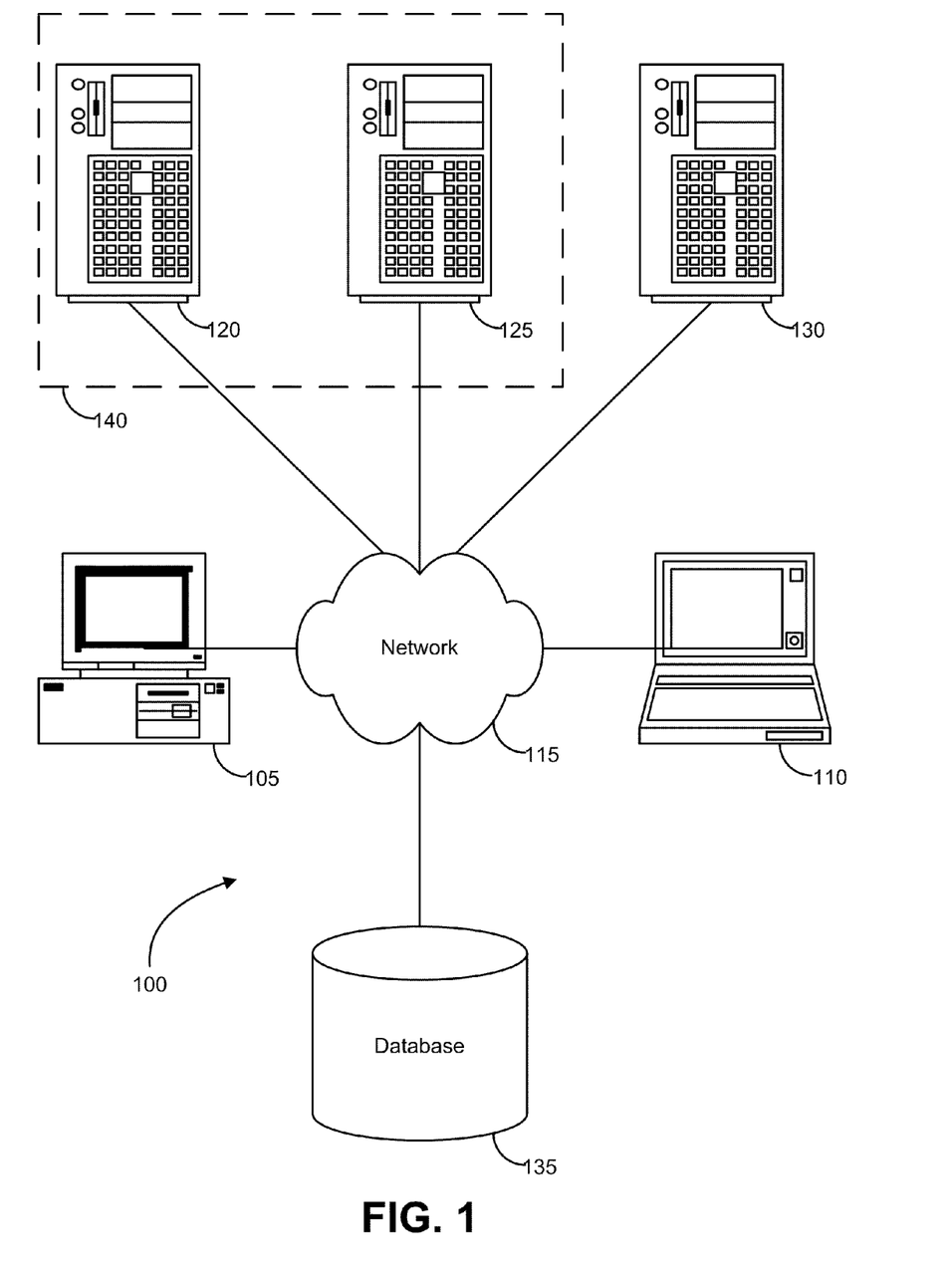
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server (s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
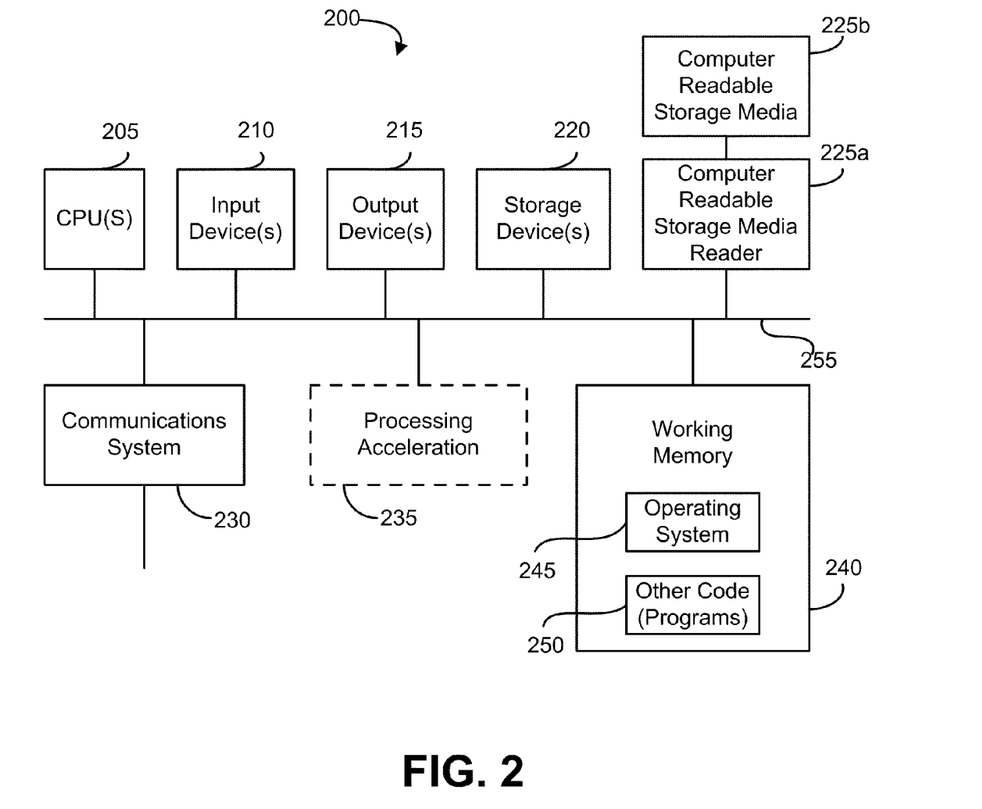
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

As noted above, embodiments of the present invention are directed to systems and methods for a handling a message that may be used, for example, to provide a message forwarding service. Such a service may be implemented based on the methods and systems described in the Related Application. Described therein are systems and methods for intelligent message processing. Such processing can provide for person to person (P2P), application to person (A2P), person to application (P2A), and application to application (A2A) messaging by intercepting the message and processing the message before directing the message to the recipient. In the case of P2P, for example, the messaging system then acts as a person to application (P2A) and application to person (A2P) system, wherein any P2P message can be intercepted and processed as necessary. Such functionality allows any desired processing of the message, such as to allow for transformation, change of address (one or many), change of channel (one or many), charging, content filtering, screening, parsing, and any other such processing. Further, such an approach allows the message to be received from the sender and directed to the recipient on different channels.

In one embodiment, a message from a sender is intercepted and routed to a message processing component such as a messaging enabler. The message processing component determines the appropriate application logic to be applied to the message, such as by applying a rule or policy to the message, and then processes the message using the determined application logic. The processed message is then directed to the intended recipient, or to a larger set of recipients. If there are multiple recipients, the processed messages can be sent in parallel or sequentially, which can depend on factors such as whether delivery takes place or confirmation is received. A message can be confirmed using any appropriate approach, such as manually by the user or automatically by the messaging channel (e.g., SMS confirmation of delivery, an email confirmation of a read, or a SIP/SIMPLE/MSRP confirmation response).

The sender and recipient each can be a user or application, for example, providing for P2P, A2P, P2A, and A2A intelligent messaging. The messaging enabler also can take advantage of a service delivery platform and service gateway to provide for SOA-based processing. Processing of the message can provide, for example, storing of message content, charging, change of address (one or many), change of channel (one or many), filtering, screening, and transforming of the message, for example. The message also can be intercepted and directed on different channels using different protocols, where the processing of the message enables the message to be delivered on a different channel. Portions of the Related Application are reproduced here with reference to FIGS. 3A and 3B for convenience.

Figure 3A:
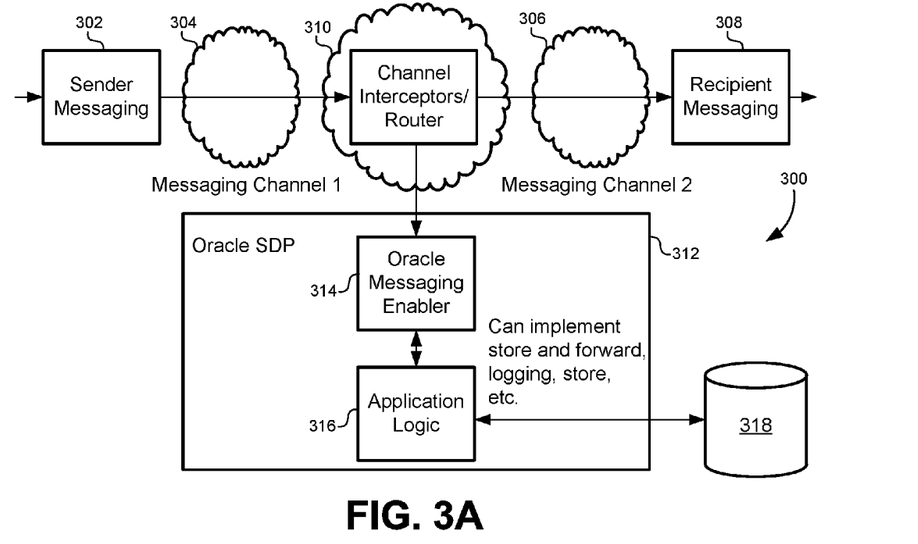
FIG. 3A is a block diagram illustrating, at a high-level, functional components of a system for providing message forwarding according to one embodiment of the present invention.

FIG. 3A is a block diagram illustrating, at a high level, functional components of a system for providing message forwarding according to one embodiment of the present invention. In the architecture 300 of this figure, a sender 302 is shown to send a message through a first channel 304 to a recipient 308 who receives messages over a second channel 306. The clients or devices for the sender and recipient, as well as the type of messaging channels for the first and second channels, can include any appropriate technology as known in the art and/or discussed or suggested herein. At least one channel interceptor 310 is used to intercept a message sent over the first channel 304 and route the message to an application, service, or component providing the application or service, such as a messaging enabler component 314 of a service delivery platform (SDP) 312. The service delivery platform can be any appropriate platform, such as the Oracle Service Delivery Platform available from Oracle Corporation of Redwood Shores, Calif. As shown, the service delivery platform can provide application logic 316 for a number of processing options that can be applied to a message. For example, the application logic can include logic for logging, storing message content to a database 318, charging, filtering, screening, transforming, redirecting to one or more other addresses (e.g. an address function of the channel that is used for communicating), deciding which channel is best to use based on policies (i.e. any combination of nay condition and any action) that can consider information such as presence (i.e., where a user is available for a certain type of communication), location (i.e., what is the most convenient or cheapest approach considering where the user is at the current time), preference (i.e., what does a prefer regarding presence location), time of day, calendar, nature or type of message, address of sender, and other such information. Parallel or sequential messaging also can be accomplished while waiting, for example, for confirmation of delivery in at least one channel, or where no confirmation or response is received. After the application logic is used to process the message, the processed message is passed back to the channel interceptor 310 to be routed over the second channel 306 to the intended recipient 308. The first and second channels can be of the same channel type, such as an SMS channel(s), or can be different channel types. Any necessary conversion for the different channel types can be handled by the application logic.

Figure 3B:
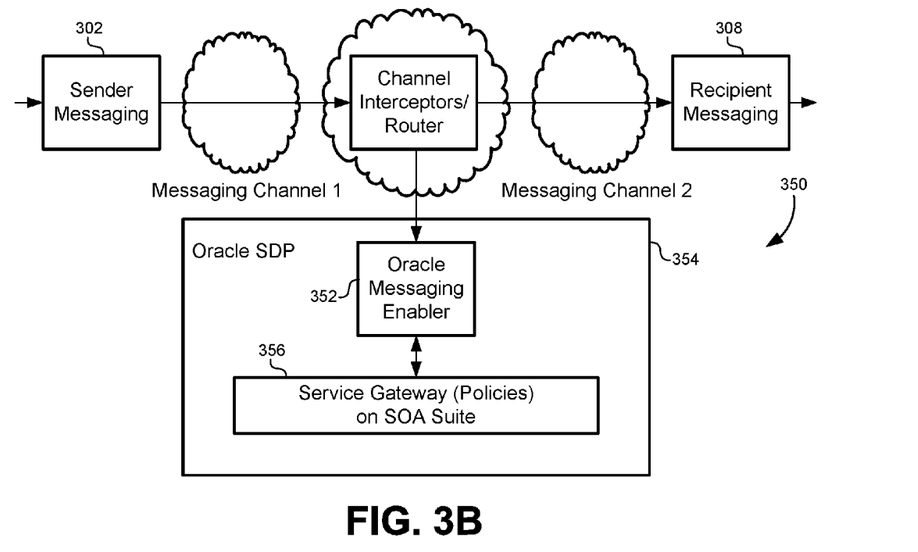
FIG. 3B is a block diagram illustrating, at a high level, functional components of a system for providing message forwarding according to an alternative embodiment of the present invention.

FIG. 3B is a block diagram illustrating, at a high level, functional components of a system for providing message forwarding according to an alternative embodiment of the present invention. This figure shows an exemplary architecture 350 wherein a messaging enabler 352 of a service delivery platform 354 utilizes a service gateway 356 in order to apply policies to a message. Reference numbers are carried over for convenience between figures for like elements, but it should be understood that this is for simplicity of explanation and should not be interpreted as a limitation on the various embodiments. The service gateway 356 can take advantage of a service-oriented architecture (SOA), for example, to implement policies as rule, Java code, or business process execution language (BPEL) workflows, for example. A SOA also can delegate any processing as needed, such as via Web services. Such an approach allows for any business process to be done at the level of the service gateway. Such an approach also can take advantage of a unified user profile (UUP), as discussed later herein. Additional details of methods and systems for implementing intelligent message processing are described in the Related Application.

Using such methods and systems, a message forwarding service can be implemented. That is, the exemplary architectures 300 and 350 described above can be adapted to receive or set one or more target addresses or forwarding instructions that are then used to deliver or forward messages from the sender 302 to intended recipients 308. For example, the SDPs 312 and 354 described above can be adapted to provide one or more interfaces (not shown here) such as web pages or IVR systems through which an entity can set one or more instructions, addresses, configuration settings, etc. Entities who may access use such interfaces, likely after proper authentication and authorization, can include but are not limited to the sender 302, the recipient 308, an operator or administrator of the service, etc. Such instructions, address, settings, etc. can be stored, for example in database 318 or other repository internal or external to the SDP 312 or 354. Thus, when a message from the sender 302 to the recipient 308 is intercepted by the messaging enabler 314 or 352, the forwarding instructions, addresses, settings, etc can be applied by the application logic 316 or as or by policies applied by the gateway 356 to affect delivery of the message to the intended recipient.

Stated another way a system 300 or 350 can comprise a communication network 304 and/or 306 and a first device 302 communicatively coupled with the communication network 304 and/or 306. The first device 302 can be adapted to send a first message to a first address via the communication network 304 and/or 306. A second device 308 can be communicatively coupled with the communication network. A service provider system 312 or 354 can also be communicatively coupled with the communication network 304 and/or 306. The service provider system 312 or 354 can be adapted to receive one or more forwarding instructions, store the one or more forwarding instructions, intercept a message from a first device to the second device, apply the one or more stored forwarding instructions to the message to determine at least one second address, and forward the message to the second device 308 at the second address. In some cases, the at least one second address comprises a plurality of addresses. Additionally or alternatively, the first address can be on a first communication channel and the second address can be on a second communication channel. The message can comprise a voice call, an email, a Short Message Service (SMS) message, a Multimedia Messaging Service (MMS) message, an Instant Message (IM), or another type of message.

In some cases, the service provider system 312 can comprise a messaging enabler 314 communicatively coupled with the communication network 304 and/or 306. In such cases, intercepting the message from the first device to the second device and forwarding the message to the second device can be performed by the messaging enabler 314. The service provider system 312 can further comprise an application 316 communicatively coupled with the messaging enabler 314. In such cases, applying the one or more stored forwarding instructions to the message to determine at least one second address can be performed by the application 316.

In some cases, the service provider system 312 can comprise an Interactive Voice Response (IVR) system (not shown here). In such cases, receiving the one or more forwarding instructions can comprise receiving the one or more forwarding instructions via the IVR system. Additionally or alternatively, the service provider system 312 can receive the one or more forwarding instructions via a web site, from the first device, or from another interface, device, or system.

Figure 4:
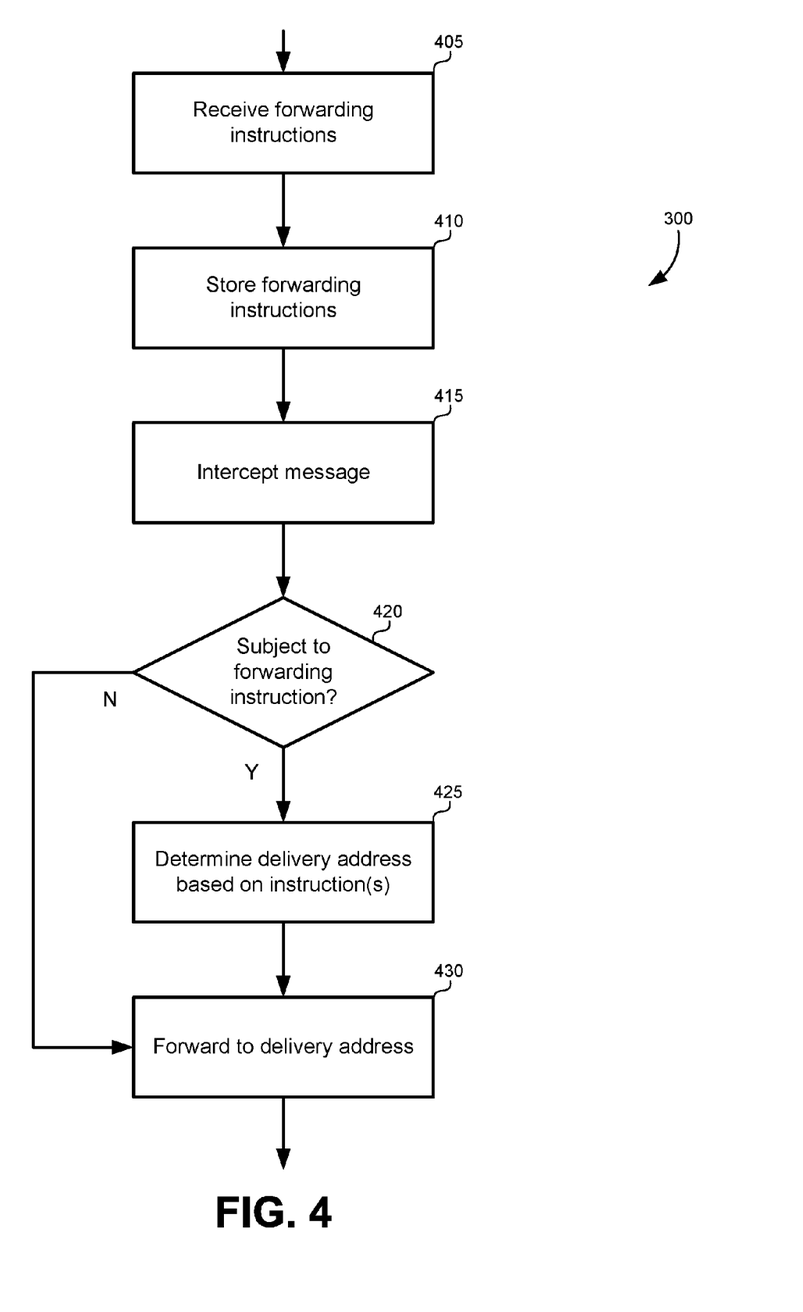
FIG. 4 is a flowchart illustrating a process for message forwarding according to one embodiment of the present invention.

FIG. 4 is a flowchart illustrating a process for message forwarding according to one embodiment of the present invention. In this example, processing begins with receiving 405 one or more forwarding instructions and storing 410 the one or more forwarding instructions. Receiving 405 the one or more forwarding instructions can comprise receiving the one or more forwarding instructions from a service provider, from the first user, or from another entity. Receiving 405 the one or more forwarding instructions can comprise receiving the one or more forwarding instructions via an Interactive Voice Response (IVR) system, via a web site, from a device of the first user, or from or through another interface, device, or system.

A message from a first user to a second user at a first address can be intercepted 415. The message can comprise a voice call, an email, a Short Message Service (SMS) message, a Multimedia Messaging Service (MMS) message, an Instant Message (IM), or another type of message. A determination 420 can be made as to whether the intercepted message is subject to one or more forwarding instructions. This determination 420 can be based, for example, on the originating address, device identifier, user, etc., the destination address, device identifier, user, etc. or on other criteria.

In response to determining 420 the intercepted message is subject to a forwarding instruction, the one or more stored forwarding instructions can be applied 425 to the message to determine at least one second address. In some cases, the at least one second address can comprise a plurality of addresses. In some cases, the first address can be on a first communication channel and the second address can be on a second communication channel. The message can be forwarded 430 to the second user at the second address.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of handling a communication, the method comprising:
   receiving, by a computer system, a plurality of forwarding policies, each of the plurality of forwarding policies comprising one or more conditions and one or more actions, wherein:
      at least one of the one or more conditions considers presence of a user on one or more devices; and
      one or more of the plurality of forwarding policies is received from a first user;
   storing, by the computer system, the plurality of forwarding policies;
   intercepting, by the computer system, a message from the first user to a second user at a first address before directing the message to the second user at the first address, wherein the first address is on a first communication channel and wherein the message is selected from a group consisting of a Short Message Service (SMS) message, a Multimedia Messaging Service (MMS) message, and an Instant Message (IM);
   selecting one or more forwarding policies from the plurality of forwarding policies;
   applying, by the computer system, the one or more forwarding policies to the message before directing the message to the second user at the first address to determine at least one second address based on at least one of the one or more conditions and at least one of the one or more actions in the one or more forwarding policies and presence information for the second user, wherein:
      the at least one second address is on a second communication channel;
      the second communication channel is selected from a group consisting of:
         a SMS channel, an MMS channel, an IM channel, an email channel, a voice messaging channel, a video messaging channel, a fax channel, and a print exchange messaging channel; and
      the second communication channel is different from the first communication channel; and
   forwarding, by the computer system, the message to the second user at the at least one second address.

2. The method of claim 1, wherein the at least one second address comprises a plurality of addresses.

3. The method of claim 1, wherein receiving the plurality of forwarding policies comprises receiving one or more forwarding policies from a service provider.

4. The method of claim 1, wherein receiving the plurality of forwarding policies comprises receiving one or more forwarding policies via an Interactive Voice Response (IVR) system.

5. The method of claim 1, wherein receiving the plurality of forwarding policies comprises receiving one or more forwarding policies via a web site.

6. The method of claim 1, wherein receiving the plurality of forwarding policies comprises receiving one or more forwarding policies from a device of the first user.

7. A system comprising:
   a communication network;
   a first device communicatively coupled with the communication network and adapted to send a first message to a first address via the communication network;
   a second device communicatively coupled with the communication network; and
   a service provider system communicatively coupled with the communication network and adapted to:
      receive a plurality of forwarding policies, each of the plurality of forwarding policies comprising one or more conditions and one or more actions, wherein:
         at least one of the one or more conditions considers presence of a user on one or more devices; and
         one or more of the plurality of forwarding policies is received from the first device;
      store the plurality of forwarding-policies;
      intercept a message from the first device to the second device at the first address before directing the message to the second device at the first address, wherein the first address is on a first communication channel and wherein the message is selected from a group consisting of a Short Message Service (SMS) message, a Multimedia Messaging Service (MMS) message, and an Instant Message (IM);
      select one or more forwarding policies from the plurality of forwarding policies;
      apply the one or more forwarding policies to the message before directing the message to the second device at the first address to determine at least one second address based on at least one of the one or more conditions and at least one of the one or more actions in the one or more forwarding policies and presence information for the second device, wherein:
         the at least one second address is on a second communication channel;
         the second communication channel is selected from a group consisting of: a SMS channel, an MMS channel, an IM channel, an email channel, a voice messaging channel, a video messaging channel, a fax channel, and a print exchange messaging channel; and
         the second communication channel is different from the first communication channel; and
      forward the message to the second device at the at least one second address.

8. The system of claim 7, wherein the at least one second address comprises a plurality of addresses.

9. The system of claim 7, wherein the service provider system comprises a messaging enabler communicatively coupled with the communication network and wherein intercepting the message from the first device to the second device and forwarding the message to the second device are performed by the messaging enabler.

10. The system of claim 9, wherein the service provider system further comprises an application communicatively coupled with the messaging enabler and wherein applying the one or more forwarding policies to the message to determine the at least one second address is performed by the application.

11. The system of claim 7, wherein the service provider system comprises an Interactive Voice Response (IVR) system and receiving the plurality of forwarding policies comprises receiving the plurality of forwarding policies via the IVR system.

12. The system of claim 7, wherein the service provider system receives the plurality of forwarding policies via a web site.

13. A non-transitory machine-readable memory device comprising a set of instructions stored thereon which, when executed by a processor, cause the processor to handle a communication by:
- receiving a plurality of forwarding policies, each of the plurality of forwarding policies comprising one or more conditions and one or more actions, wherein:
  - at least one of the one or more conditions considers presence of a user on one or more devices; and
  - one or more of the plurality of forwarding policies is received from a first user;
- storing the plurality of forwarding policies;
- intercepting a message from the first user to a second user at a first address before directing the message to the second user at the first address, wherein the first address is on a first communication channel and wherein the message is selected from a group consisting of a Short Message Service (SMS) message, a Multimedia Messaging Service (MMS) message, and an Instant Message (IM);
- selecting one or more forwarding policies from the plurality of forwarding policies;
- applying the one or more forwarding policies to the message before directing the message to the second user at the first address to determine at least one second address based on at least one of the one or more conditions and at least one of the one or more actions in the one or more forwarding policies and presence information for the second user, wherein:
  - the at least one second address is on a second communication channel;
  - the second communication channel is selected from a group consisting of:
    - a SMS channel, an MMS channel, an IM channel, an email channel, a voice messaging channel, a video messaging channel, a fax channel, and a print exchange messaging channel; and
  - the second communication channel is different from the first communication channel; and
- forwarding the message to the second user at the at least one second address.

14. The non-transitory machine-readable memory device of claim 13, wherein one or more of the forwarding policies are received from one of a web interface, a device user interface, or messages from an end device.

15. The method of claim 1, wherein forwarding the message to the second user comprises forwarding the message to one or more second addresses in parallel.

16. The method of claim 1, wherein forwarding the message to the second user comprises forwarding the message to one or more second addresses in sequentially.

17. The system of claim 7, wherein forwarding the message to the second device comprises forwarding the message to one or more second addresses in parallel.

18. The system of claim 7, wherein forwarding the message to the second device comprises forwarding the message to one or more second addresses in sequentially.

19. The method of claim 1, wherein the first communication channel and the second communication channel use different communication protocols.

* * * * *

UNITED STATES PATENT AND TRADEMARK OFFICE
CERTIFICATE OF CORRECTION

PATENT NO. : 9,503,407 B2  Page 1 of 1
APPLICATION NO. : 12/957697
DATED : November 22, 2016
INVENTOR(S) : Maes It is certified that error appears in the above-identified patent and that said Letters Patent is hereby corrected as shown below:

On the Title Page

On Page 4, Column 2, under Other Publications, Line 1, delete "filed filed" and insert -- filed --, therefor.

In the Specification

In Column 4, Line 17, after "thereof" insert -- . --.

In Column 5, Line 44, after "may" delete "can".

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*